(12) United States Patent
Pere

(10) Patent No.: US 7,100,206 B1
(45) Date of Patent: Aug. 29, 2006

(54) METHOD FOR SECURED ACCESS TO DATA IN A NETWORK

(76) Inventor: Paul Pere, Nymphenburger Strasse 92, 80636 Munich (DE)

( * ) Notice: Subject to any disclaimer, the term of this patent is extended or adjusted under 35 U.S.C. 154(b) by 0 days.

(21) Appl. No.: 09/701,790

(22) PCT Filed: Jun. 2, 1999

(86) PCT No.: PCT/EP99/03839

§ 371 (c)(1),
(2), (4) Date: Dec. 1, 2000

(87) PCT Pub. No.: WO99/63420

PCT Pub. Date: Dec. 9, 1999

(30) Foreign Application Priority Data

Jun. 3, 1998 (DE) .................................. 198 24 787

(51) Int. Cl.
*H04L 9/00* (2006.01)
*G06Q 10/00* (2006.01)
*A61B 5/00* (2006.01)
*G06F 19/00* (2006.01)

(52) U.S. Cl. ............................. 726/26; 726/4; 713/185
(58) Field of Classification Search ................ 713/201, 713/185, 200; 726/26
See application file for complete search history.

(56) References Cited

U.S. PATENT DOCUMENTS

| 5,678,041 | A | | 10/1997 | Baker et al. | |
|---|---|---|---|---|---|
| 5,694,471 | A | * | 12/1997 | Chen et al. | ............ 705/76 |
| 5,699,526 | A | | 12/1997 | Siefert | |
| 5,787,175 | A | * | 7/1998 | Carter | ............ 713/165 |
| 5,867,821 | A | * | 2/1999 | Ballantyne et al. | ............ 705/2 |
| 6,055,506 | A | * | 4/2000 | Frasca, Jr. | ............ 705/3 |
| 6,234,964 | B1 | * | 5/2001 | Iliff | ............ 600/300 |
| 6,463,417 | B1 | * | 10/2002 | Schoenberg | ............ 705/2 |
| 6,651,060 | B1 | * | 11/2003 | Harper et al. | ............ 707/9 |

FOREIGN PATENT DOCUMENTS

| EP | 0398492 | | 11/1990 |
|---|---|---|---|
| JP | 10111897 | | 4/1998 |
| WO | 9729428 | | 8/1997 |
| WO | 9815910 | | 4/1998 |
| WO | WO 98/15910 | * | 4/1998 |

OTHER PUBLICATIONS

Article: S. De Capitani di Vimercati et al., "Access Control in Federated Systems" *Association For Computing Machinery ISBN: New Paradigms Workshop* (Sep. 17-20, 1996), pp. 87-99.

D. Caramella et al., "Security Management For Radiological Information Systems", *CAR 97* (Jun. 1997), pp. 25-28 (Abstract of Article).

(Continued)

*Primary Examiner*—Kambiz Zand
(74) *Attorney, Agent, or Firm*—Elliott N. Kramsky

(57) ABSTRACT

A method for secured access to data in a network has the effect that data protection rights are respected, especially personal data present in a network with distributed memories. The method is based on the granting of access rights, with the possibility of revocation, to the data available in the network, and the storage of data within the network only after authorization by the owner of the rights to the data. When certain data are requested, only the references of those data records to which the requesting party also has the access rights can be given. Identification of the data is not possible without access rights. Should certain data be accessed, the access rights may be verified before data access is permitted.

37 Claims, 5 Drawing Sheets

OTHER PUBLICATIONS

Article: Telesec Kommunikationssicherheit, "Telekom, Produkentwicklung Telesec beim Fernmeldeamt Siegen" (1994), pp. 7-14.

C. Piret et al., "Development of a Coherent Policy of Security-Confidentiality in a Heterogeneous University Hospital in Belgium", *Proceedings of Medical Informatics*, Europe 96 (1996), pp. 951-956.

* cited by examiner

METHOD FOR SECURED ACCESS TO DATA IN A NETWORK

BACKGROUND

1. Field of the Invention

The present invention relates to a method for secured access to data in a network of the type that includes an information center and at least one data area access system (a device which provides storage space (data area) and permits access to stored data).

2. Description of the Prior Art

In the near future, "networks of practices" will be developed for different interest groups of a public or private nature (e.g., in health care, sickness insurance agencies, the health ministry and medical associations). The basic idea of these networks of practices is that, on the basis of better communication between different doctors' practices and/or hospitals, the number of often-redundant medical examinations currently carried out may be reduced. As an example, it would not be necessary to produce a further X-ray image of a lung of a patient if renewed diagnosis (e.g., by a different doctor) were possible with the assistance of an easily accessible, recently taken X-ray image of the patient's lung. It is in the public interest and that of insurance companies to reduce health costs. For this reason, the latter, in particular, would like to set up autonomous medical networks with the aid of which a patient's different doctors can access data already prepared by their colleagues to thus provide the patient with better and more cost-effective medical care.

In established test models, the main problem is that of ensuring secure communication. There are different known ways of connecting a doctor to medical units, mainly restricted to a certain group of doctors (e.g., radiologists), with a restriction to a specific type of information/data, for example X-ray plates, being prescribed.

Some national and international standards that define the way in which medical data are generated and transmitted already exist (e.g., DICOM for X-ray plates, BDT for the data of a patient, GDT for medical data generated by medical equipment such as an electrocardiograph or other devices). No special requirements have to be met in these cases with regard to the secured transmission of medical data as this is no longer a problem today on account of various known encryption mechanisms.

One particular task in the transmission of medical data is to safeguard the rights to personal privacy of the patient. Currently, the transmission of medical information is always illegal whenever it is not restricted to a closed medical group such as a hospital or a doctor's practice. To describe a network of practices with hundreds of different practices and hospitals as a closed group would probably have to be interpreted in the legal sense as an evasion of the patient's personal rights. In this case, a patient would have no possibility of knowing all the members of the group and could scarcely make use of his right to select a different group (e.g., a different hospital).

SUMMARY AND OBJECTS OF THE INVENTION

It is therefore the object of the invention to specify a method for secured access to data in a network, in which only the owner of the rights to the data can define, modify or withdraw access rights of third parties to the data.

The present invention addresses the preceding and other objects by providing a method for secured access to data in a network including an information center and a plurality of data area access systems in which permission to store and define access rights of third parties to data at the information center are limited to the owner of rights to the data to be stored. The method is begun by, in each case, storing data only once in one of the data area access systems not accessible to the owner of the rights. The presence of data of a certain type in each data area access system is registered at the information center. This is followed by the owner, should he wish, defining access rights of third parties to the data at the information center.

A list of the data present of a certain type, specifying the data area access system storing the data, is transmitted from the information center to a requesting data area access system for which the access rights of the requesting data area access system correspond to the access rights defined at the information center for such data. This occurs after a request of a requesting data area access system for data of such certain type.

The data of the certain type is then directly transmitted by the data area access system storing such data to the requesting data area access system subject to such data area access system storing the data having received a confirmation from the information center.

The method according to the invention provides that only the owner of the rights to certain data can define access rights to these data. Once stored, the data remain where they are stored and are not gathered at a central location. Access to such stored data is possible only with the authorization of the owner of the rights to these data. For medical data, this means, for example, that they remain at the place where they are prepared and that other doctors can access these data only with the permission of the respective patient. Such permission can be granted generally for certain doctors or else granted only for the individual case.

It is also possible to withdraw permission again once it has been granted.

The preceding and other features of the invention will be further appreciated by the detailed description that follows. Such description is accompanied by a set of drawing figures. Numerals of the drawing figures, corresponding to those of the written description, point to the various features of the invention with like numerals referring to like features throughout both the drawing figures and the written description.

DETAILED DESCRIPTION OF THE PREFERRED EMBODIMENT

Figure 1:
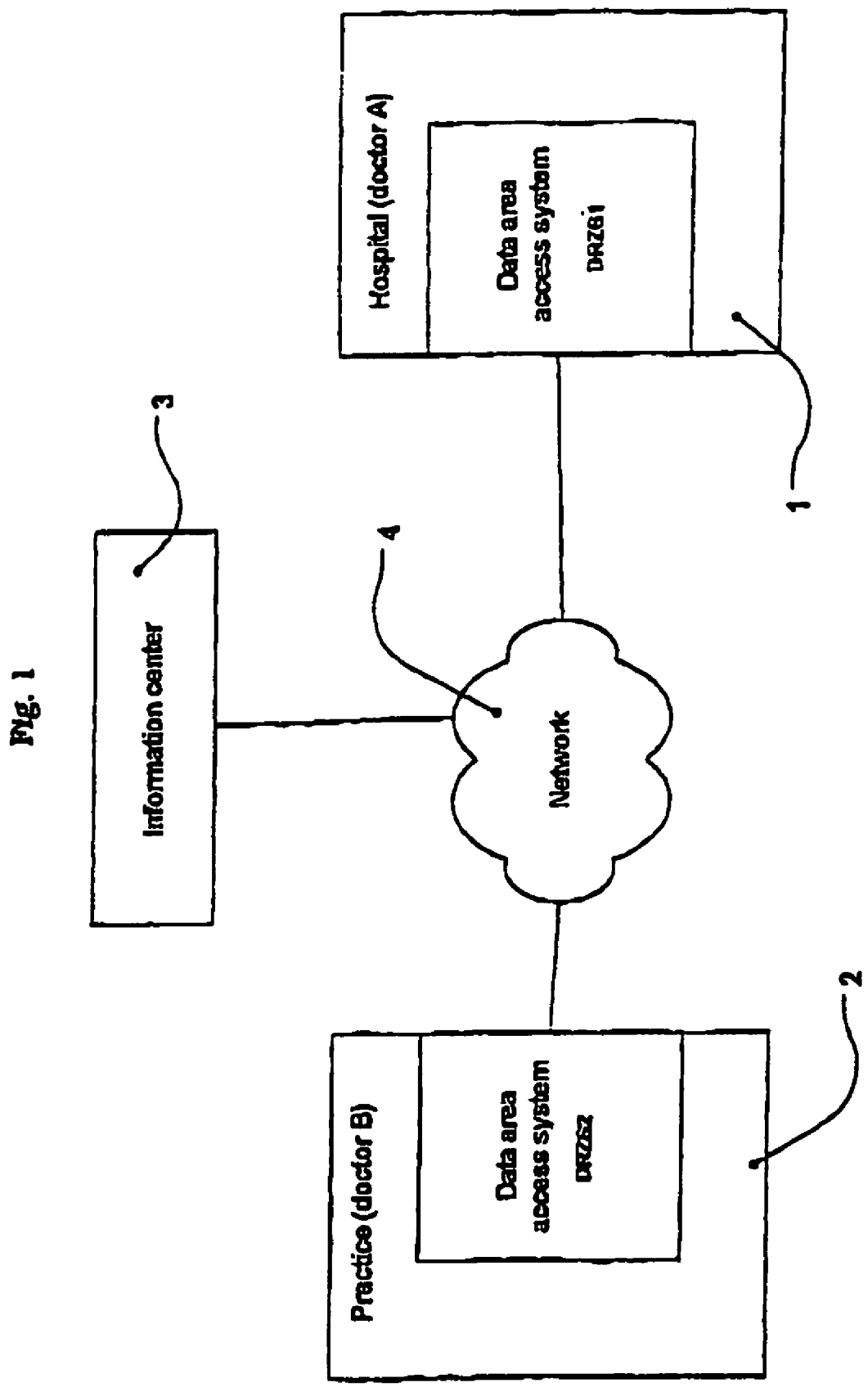
FIG. 1 illustrates a network for employing the method of the invention.

The method according to the invention is explained below, taking a network of practices as an example. Here, the system serves to provide a group of doctors with the medical records of their patients. The system can be accessed by a number of doctors, each having access to a data area access system. In addition to the data area access systems, the system has an information center. For the sake of simplicity, in FIG. 1 this system is shown with only two data area access systems 1, 2, one of which has an identification DRZS1 and the other DRZS2. Such a data area access system 1, 2 may be set up at the premises of one or more doctors. For example, it is shown in FIG. 1 that the data area access system 2 is set up at a practice of a doctor B and the data area access system 1 is set up at a hospital in which a doctor A has access authorization. Each data area access system 1, 2 can communicate via a network 4 with an information center 3 or another data area access system 1, 2.

Each data area access system 1, 2 contains a secure data memory for storing the medical data of patients. The memory is access-secured by data access that takes place only by means of the method of the invention. As a result, misuse of data stored in the memory is not possible. Furthermore, it is insured by the invention that only new data can be stored (i.e., data which have not already been stored in another data area access system 1, 2). Furthermore, both the doctor and the patient can communicate independently of each other via the data area access system 1, 2 with the information center 3 or another data area access system 1, 2 connected to the network 4, with only one doctor being able to store data.

In the information center 3, references to the data of the patients and the associated identification information of the patients and doctors are stored at a central location. The security of the individual data transmissions within the system is insured by encryption of the data transmissions between all participants. This involves each item of information transmitted within the system being provided with a digital signature. In the case of every access, authorization is demanded, and all data are transmitted and stored in encrypted form. Each participant (e.g., a doctor or a patient), as well as the information center, and each data area access system have two pairs of public and secret codes for data encoding. One pair of such codes, known as the encryption codes, is used for the secure data transmission and the other (the signature codes) provides the transmitted information with a digital signature and thereby confirms the sender. The secret codes are known only to the respective participant, information center or data area access system. In contrast, the public codes are accessible to all participants (i.e. every participant in the system can obtain a public code of any other participant). Whenever a participant sends an item of information over the network, the following method is performed:

1. The sender provides the item of information sent by him with a digital signature by using his secret signature code. As a result, the sender cannot be imitated and the recipient is able, with the aid of the public signature code, to confirm the digital signature employed. If, for example, a data area access system sends the patient information to the information center, such information must also be encrypted with the secret signature code of the patient when the data are generated. This assures that the information really does belong to the named patient and that the patient agrees to the transmission of this information.

2. The sender encrypts all transmitted data by means of a public encryption code of the recipient to whom the data are being transmitted. As a result, the transmitted data can be decrypted only using the secret encryption code of the recipient.

3. Whenever a participant accesses the system, he must be authorized and have his identity confirmed. A special data carrier, such as a smart card, may serve for transmitting the identity of the participant. Of course, other methods of personal identification may also be used, such as voice recognition, image recognition, fingerprint recognition, etc., which can be used individually or in combination.

A special data carrier, such as a smart card, may be used as a secure memory for the secret codes of a participant and other personal information. The public codes of the participants, the information center 3 and the individual data area access systems 1, 2 may be stored centrally at the information center 3.

Figure 2:
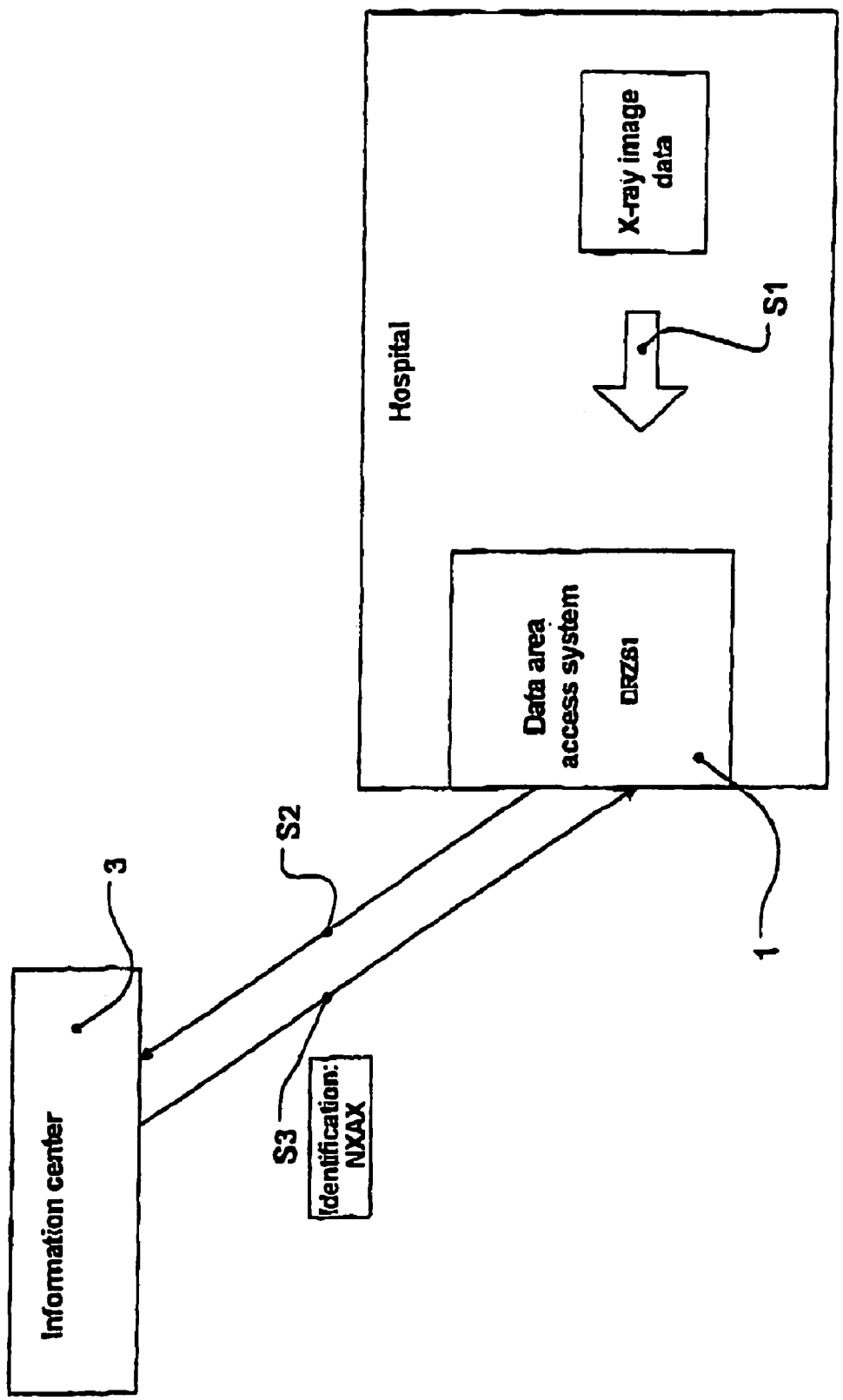
FIG. 2 illustrates the generation and storage of data in accordance with the method of the invention.

FIG. 2 illustrates the generation of data of a patient and the procedure by which such data are made available in the system. The patient N visits the doctor A on a day X and has a new medical data unit (e.g., an X-ray image) prepared. If the patient N desires, this data unit can be made available to other doctors over the network of practices. In this case, in a first step S1, the data of the X-ray image are stored in electronic form, together with an electronic form that includes the type of the data, in the data area access system 1 with the identification DRZS1 of the doctor A. The type of data in this case comprises information that it is an X-ray image of the patient N, which the doctor A took on day X. It is also possible for the type of data to comprise only one of these items of information, or for other information to be added, such as the identification DRZS1 of the data area access system 1 storing the data. The data of the X-ray image are stored together with the electronic form in the secured data memory of the data area access system 1. Storage of data is only possible with authorization of the owner of the rights to these data, which may be accomplished, for example, by the patient's smart card.

In a second step S2, the information center 3 is notified by the data area access system 1 that it has new data, that is an X-ray image of the patient N. Such notification may take place either directly after the storage of the new data or at a certain point in time, for example regularly at a certain time of day. It is also possible for the information center 3 to send inquiries as to whether new data have been stored to each data area access system 1, 2 at certain points in time.

In a third step S3, the information center 3 registers the presence of the X-ray image of the patient N of the day X with the availability in the data area access system 1 and allocates these data a unique identification (e.g., NXAX), after which such identification is transmitted, with a notifying confirmation, from the information center 3 to the data area access system 1. In the data area access system 1, the identification thus allocated is used for administration of the associated data, in that it is added to these data. It can be insured by an appropriate configuration that data are not replicated in the system. At the latest, when the data are registered by the information center 3, a verification of the authorization for data storage by the patient takes place. In the case of no authorization, access rights to these data are not granted to any participant.

In FIG. 2 and the subsequent figures, the hollow arrow signifies a transmission of data into the system (i.e., the storage of new data in a data area access system 1, 2) and the solid arrows signify communications over the network 4 such as a request or notifications. It can consequently be seen from FIG. 2 that, in the system described, the medical data are not copied into the information center 3 but always remain in the data area access system 1 after they have been stored. The information center 3 keeps only the references to these data rather than the data themselves. Furthermore, a data transmission via the network 4 is indicated in the figures by means of boxes in which the data transmitted are specified next to solid arrows.

Figure 3:
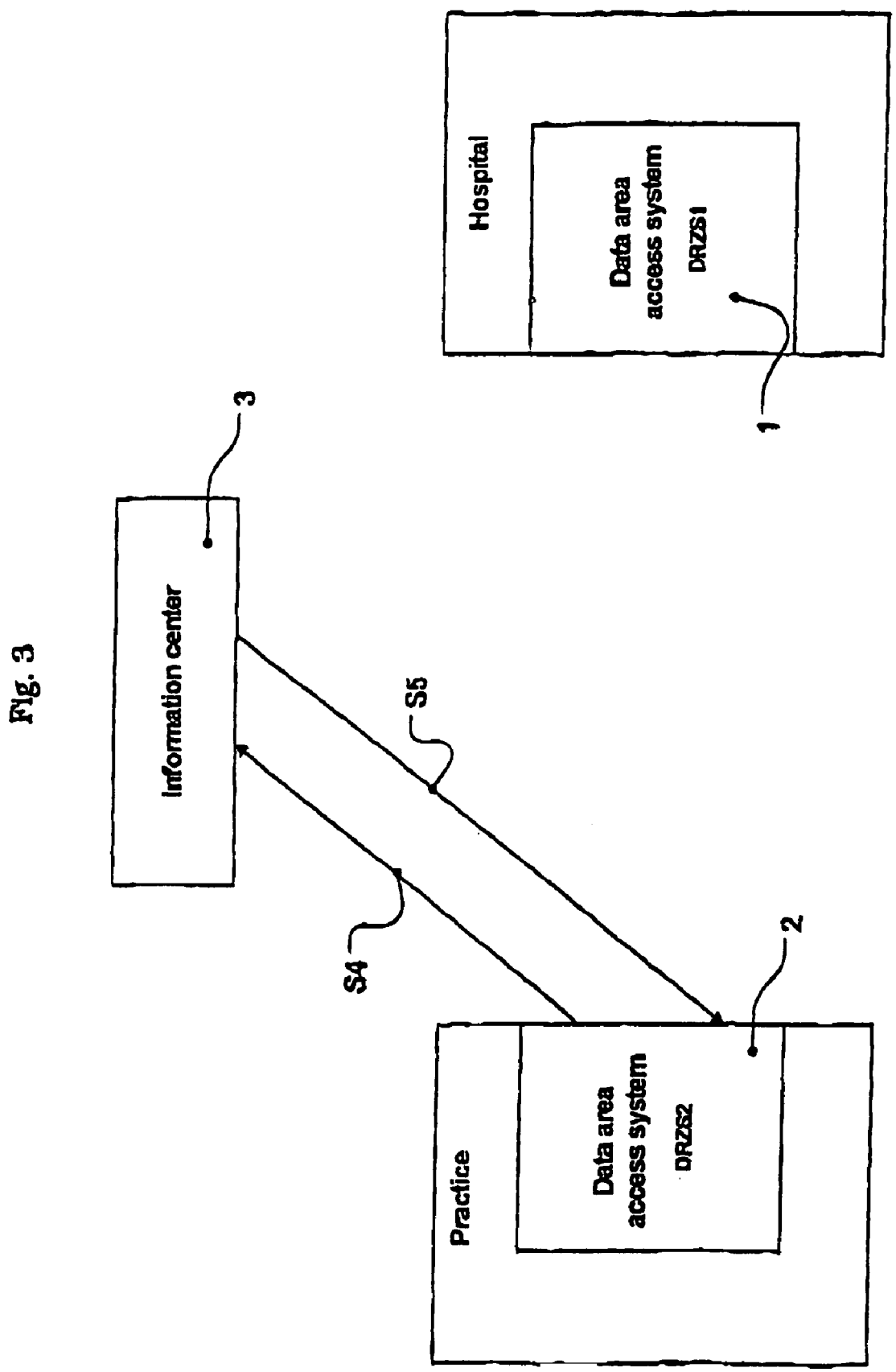
FIG. 3 illustrates an unsuccessful request for data.

FIG. 3 illustrates an attempt to access data via the network of practices. On a day Y, the patient N visits a doctor B, who has a data area access system 2 with the identification DRZS2. This doctor B requires a current X-ray image of the patient N. Therefore, in a step S4, the doctor sends from his data area access system 2 a request for X-ray images of the patient N to the information center 3. The information center 3 prepares a list of references to all X-ray images of the patient N currently present in the system (i.e. stored in any of the connected data area access systems and registered by the information center 3). The information center 3 subsequently verifies the access rights to the data shown in this list with regard to the doctor B from whom the request for X-ray images of the patient N came, and, in a step S5, transmits only the references of the X-ray images of the patient N to which the doctor B has been granted access rights (by the patient N, who in this case is the owner of the rights to his data). Since, in this case, no access rights to his X-ray images have been defined by the patient N, this list is empty. Therefore, the information center 3 sends a message "no data found" to the data area access system 2. The latter outputs this message to the doctor B.

Accordingly, no doctor can identify the data in the system without access rights of the patient who is the owner of the rights to the stored data. It is only possible to break through this secure system for data for which access rights have been specifically defined if the patient N has, for example, given certain doctors general access rights in advance to all or certain of his data. Even in such a case, however, the patient has determined who can access his data. Here, too, his data protection rights have been respected.

Figure 4:
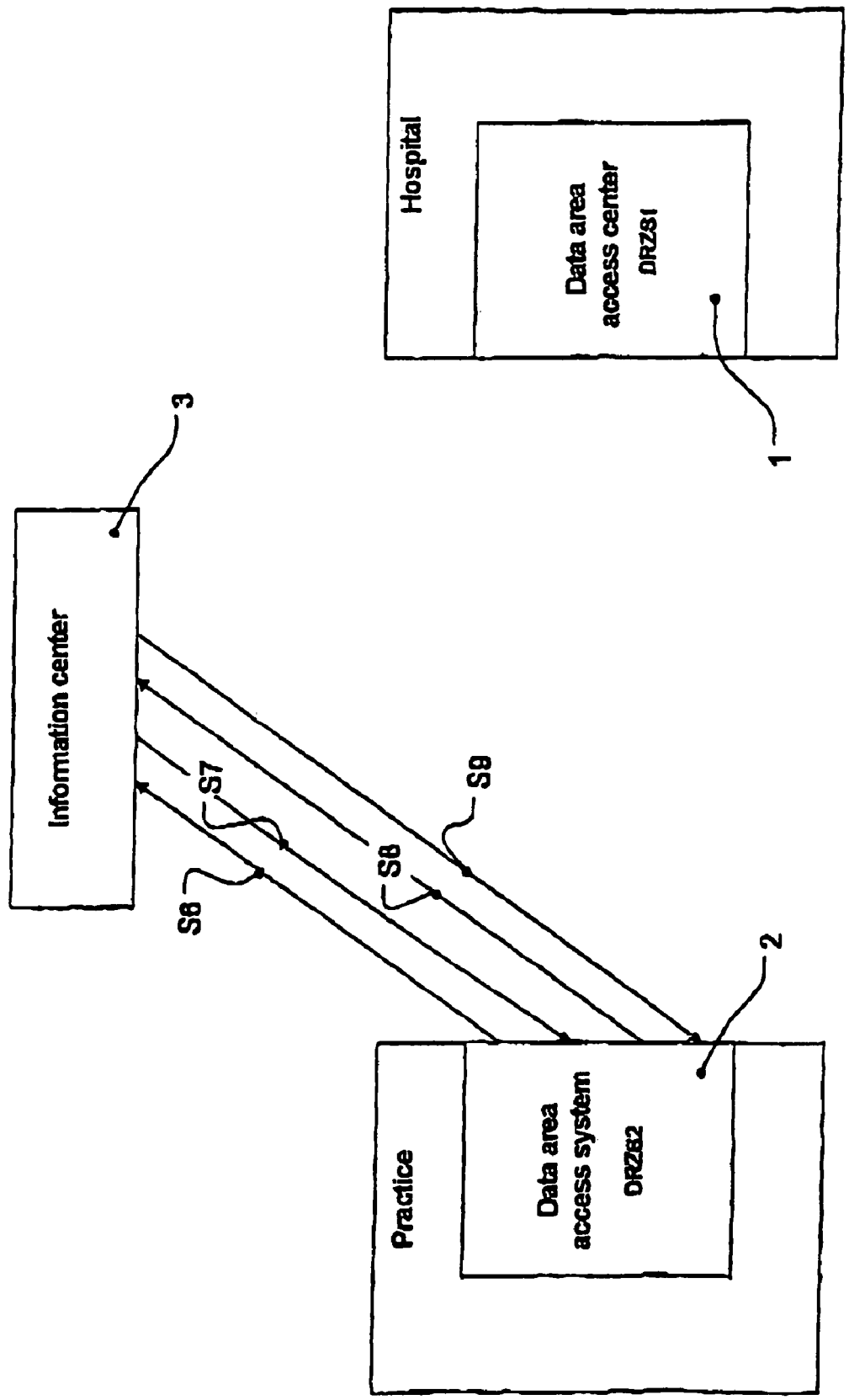
FIG. 4 illustrates the retrieval and granting of access rights to certain data by the owner of the rights to such data.

FIG. 4 illustrates the definition of access rights of the patient at the information center 3. In step S6, the patient N can retrieve a list of all his data currently available in the system as a whole from the information center 3 via the data area access system 2. Alternatively, he can retrieve only a list of certain data. In a step S7, the information center processes this request and sends the requested list to the data area access system 2. The patient N can now define access rights to the data shown by the list. If, for example, he has requested a list of all his X-ray images, he can define that the doctor B and/or any other doctor or a certain group of doctors can access the X-ray image taken on the day X by the doctor A with the identification NXAX. Such an access right may be for a limited or an unlimited time. The access right may also be granted in advance for the data available in the future. Once the patient N has defined all the desired access rights, he can, in a step S8, bring about an update of the access rights at the information center 3 via the data area access system 2. In a step S9, the information center 3 stores the changes and sends a confirmation back to the data area access system 2.

The access rights may also be granted at the time that new data are being stored in a data area access system 1, 2. A patient or other owner of rights to data stored in a data area access system 1, 2 can grant access rights from any desired data area access system 1, 2. For example, it is conceivablde for such data area access systems 1, 2 to be installed not only at doctors' practices or hospitals but also in pharmacies, or for access to a network of practices also to be possible via the Internet whereby every computer capable of being connected to the Internet could become a data area access system or at least an access system that does not provide any storage space. The owner of the rights to data stored in a data area access system 1, 2, (in this case the patient) is the only person who, on the basis of his authorization and identification, can be shown the access rights by the information center 3 and/or can modify them at the information center 3.

Figure 5:
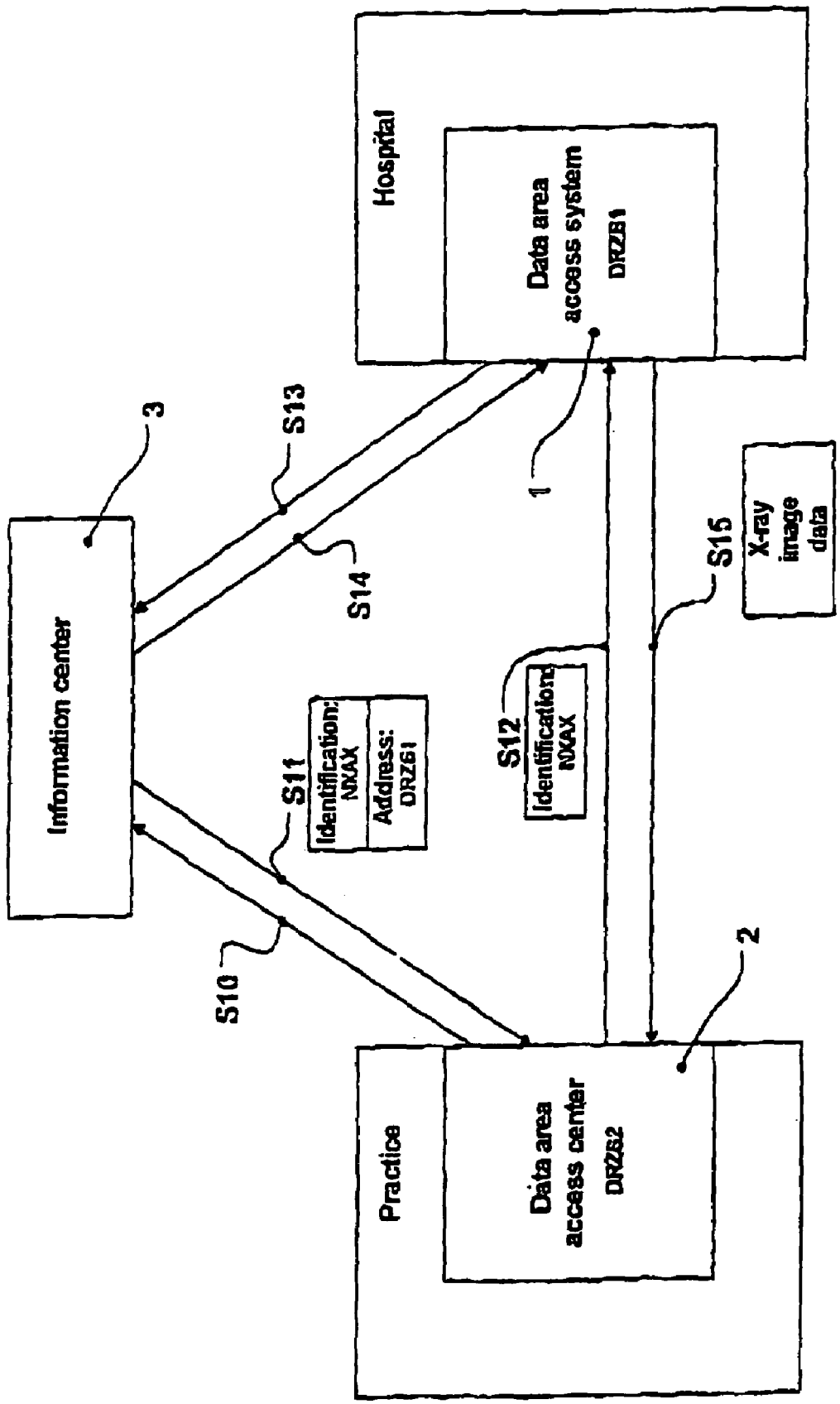
FIG. 5 illustrates a successful request for data and their transmission to the requesting location.

FIG. 5 illustrates the sequence required for successfully accessing certain data. After the access rights to the X-ray image of the patient N taken on the day X by the doctor A, with the identification NXAX, have been defined by the patient N for the doctor B, the doctor B launches a renewed request to the information center, in a step S10, to specify all references to the X-ray images of the patient N. In step S11, the information center compiles a list of the references of all the X-ray images of the patient N currently in any of the data area access systems, verifies the access authorizations with regard to the doctor B making the request and selects only the X-ray images which may be accessed by doctor B. It then transmits the associated references to the data area access system 2. In this case only the identification NXAX of the X-ray image of the patient N produced on day X by doctor A is transmitted together with the memory location/address (in this case the data area access system 1 with the identification DRZS1) to the data area access system 2, which displays this information to doctor B. Doctor B can consequently see only the references to the data to which the patient N has granted his access rights. The references may include, for example, the type of data (X-ray image), the date of the examination (day X), the doctor carrying out the examination (doctor A), the memory location of the data (data area access system 1) with the identification DRZS1. In step S12, the doctor B selects the X-ray image with the identification NXAX, whereupon the data area access system 2 sends a request of doctor B for the X-ray image with the identification NXAX to the data area access system with identification DRZS1 (data area access system 1). In step S13, the data area access system 1 sends an inquiry to the information center 3 to confirm that doctor B has the access rights to the X-ray image with the identification NXAX. The information center 3 replies, in a step S14, with a confirmation, whereupon, in a step S15, the data area access system 1 transmits the data of the X-ray image with the identification NXAX to the data area access system 2. The latter presents the received data of the X-ray image in an acceptable form and/or allows doctor B to store the data for further processing, such storage having to take place not in the secure memory of the data area access system 2 but on another storage medium, since otherwise the data would be replicated in the system.

Once an authorized person has stored the received data for further processing, such person can repeatedly access the stored data. Access via the network of practices is only possible, however, as long as the owner of the rights to these data allows it.

Since the method according to the invention consequently provides that storage of certain data is possible only with the permission of the owner of the rights and retrieval of such data is possible only with the permission of the owner, the personal rights of a patient, for example, are respected. The system operates in an entirely transparent way for any user, without the individual user having to have any knowledge of the security or transmission processes. The encryption of data sent has the effect that unauthorized persons cannot "listen in" and the definition of certain access rights for certain data by the owner of the rights has the effect that unauthorized access to these data is not possible.

When the data are transmitted, it is particularly advantageous if the appropriation specified by the owner of the access rights for the transmission of these data in the original data context is transmitted together with these data in the form of an "electronic watermark" and these data are additionally marked visibly as an appropriated copy of the original data.

The method of the invention for secured access to data in a network can also be applied to non-medical networks, since a system of controlling the distribution of individual data is proposed. Another area of application is, for example, the distribution of personal data for identification purposes, whereby the transmission of these data between different administrative authorities without a centralized database of individual citizens can be made more flexible. The system according to the invention has the effect that the citizen concerned has sole power of disposal over his personal data.

While this invention has been described with reference to its presently preferred embodiment, it is not limited thereto. Rather, the invention is limited only insofar as it is defined by the following set of patent claims and includes within its scope all equivalents thereof.

What is claimed is:

1. A method for secured access to data in a network including an information center and a plurality of data area access systems in which permission to store said data and to define, at the information center, access rights of third parties to said data is limited to the owner of rights to said data, said method comprising the steps of:
   a) in each case storing the data only once in one of said data area access systems not accessible to the owner of the rights; then
   b) registering the presence of data of a certain type in each data area access system at said information center, followed by the owner of the rights to the stored data, defining access rights of third parties to said data at said information center;
   c) transmitting a list of the data present of a certain type, specifying the data area access system storing said data, from said information center to a requesting data area access system for which the access rights of said requesting data area access system correspond to the access rights defined at said information center for said data, and after a request of a requesting data area access system for data of said certain type wherein a data area access system storing data responds to a request for certain data of a certain type by a requesting data area access system by verifying the access rights through an inquiry to the information center as to whether the requesting data area access system has access rights to the certain data of a certain type; and then
   d) directly transmitting said data of said certain type by said data area access system storing said data to said requesting data area access system subject to said data area access system storing said data having received a confirmation from said information center.

2. A method as defined in claim 1 wherein an authorization of the storage of data and of the definition of the access rights of third parties to the data takes place by means of an identity check of the owner of the rights to the data.

3. A method as defined in claim 1 or 2, wherein data to be stored are stored in said data area access system with an electronic form which contains the type of the data.

4. A method as defined in claim 1, wherein a data area access system receiving certain data of a certain type allows access to the received data only directly after a respective reception of said data.

5. A method as defined in claim 1, wherein a data area access system storing certain data of a certain type grants access to the certain data of a certain type only if a positive verification has taken place through an inquiry to the information center as to whether said data area access system storing said certain data of a certain type can show access rights for said certain data of a certain type.

6. A method as defined in claim 1 wherein the information center is notified by a data area access system having new data about the presence of new data of a certain type, whereupon said information center sends a notifying confirmation to the data area access system.

7. A method as defined in claim 1 wherein said data are identified on the basis of an identification which is allocated as a unique identification by said information center and is transmitted by said information center after a registration of new data to the data area access system storing said data, in order for said system to append the respective identification to the respective data.

8. A method as defined in claim 1 wherein, after an inquiry for data of a certain type by a data area access system, said information center prepares a list of all the data present of this certain type before it verifies the access rights to the data of the certain type, in order to transmit the list of data present of this certain type, specifying the data area access system respectively storing these data, to the requesting data area access system for which the requesting data area access system can show said access rights.

9. A method as defined in claim 1 wherein, when data access is desired by a data area access system to data of a certain type, firstly a request for such data of the certain type is sent to the information center.

10. A method as defined claim 1 wherein, when data transmission is desired from a data area access system storing data to a requesting data area access system, firstly a request for certain data of a certain type is sent by the latter system to the data area access system storing these certain data of a certain type.

11. A method as defined in claim 1, wherein the data in a data area access system are stored in a secure data memory, no direct access being possible to the data stored therein.

12. A method as defined in claim 1 wherein the type of the data is determined by their content and/or the owner of the rights to the data.

13. A method as defined in claim 1 wherein the access rights to stored data can be defined by the owner of the rights to the data at any point in time after their registration at the information center and, after that, can be changed again as desired by a re-definition by the owner of the rights to the data.

14. A method as defined in claim 1 wherein the access rights to stored data can be granted by the owner of the rights to the data when they are stored in a data area access system.

15. A method as defined in claim 1 wherein communication between a data area access system and the information center or another data area access system takes place in encrypted form.

16. A method as defined in claim 15, wherein the sender provides the information sent by him with a digital signature by means of a secret signature code, whereby the recipient can verify the sent information by means of an associated public signature code.

17. A method as defined in claim 15 or 16 wherein the sender encodes all transmitted data by means of a public encryption code issued by the recipient, whereby only the recipient can decode the transmitted data by means of a secret encryption code.

18. A method as defined in claim 15 wherein not only each data area access system and the information center but also each participant has a secret signature code and a secret encryption code and a public signature code and a public encryption code.

19. A method as defined in claim 18 wherein the secret signature codes and encryption codes and/or public signature codes and encryption codes of a participant are stored on a data carrier, such as a smart card.

20. A method as defined in claim 1 wherein a participant accessing the network must authorize himself and his identity is verified by the information center.

21. A method as defined in claim 20 wherein the identity of a participant is stored on a data carrier such as a smart card.

22. A method as defined in claim 1 wherein the permission for storing the data is given by the owner of the rights to the data at the latest when the data are registered at the information center, said information center not allowing any subsequent data access to these data without correct authorization.

23. A method as defined in claim 1 wherein, when the data are transmitted, the appropriation specified by the owner of the access rights for the transmission of these data in the original data context is transmitted together with these data in the form of an electronic watermark and these data are additionally marked visibly as an appropriated copy of the original data.

24. A system comprising:
    a) a plurality of data area access systems, each having a secure data memory associated therewith;
    b) an information center, wherein (i) said system is configured and adapted such that entry of a piece of data into said system comprises a writing of said piece of data to a respective one of said secure data memories that can only be effected by an authorized user of the data area access system associated with the respective secure data memory and in conjunction with the authorization of an authorized user of said information center, (ii) said information center is configured and adapted for storing information that defines respective access rights for each piece of data entered into the system, (iii) said system is configured and adapted such that display and modification of the information defining the access rights to said entered piece of data is restricted to said authorized user of said information center, in conjunction with whose authorization said entry was effected, and (iv) said system is configured and adapted such that access to any piece of data entered into the system is restricted to those authorized users of the system having appropriate access rights as defined by said information for the piece of data to be accessed;
    c) said system is configured and adapted such that in each case the data is stored only once in one of said data area access systems not accessible to the owner of the rights; and
    d) one or more of said data area access systems are operable in a mode in which an authorized user of said information center who is not an authorized user of the respective data area access system can display and modify that part of said information defining access rights that is not restricted from display and modification by them, yet cannot access any pieces of data entered into the system.

25. The system of claim 24, wherein said system is configured and adapted such that access to any piece of data entered into the system can be effected solely via the data area access systems and solely by authorized users of the respective data area access system via which access is to be effected.

26. The system of claim 25, wherein all authorized users of said information center are not authorized to use any of said data area access systems.

27. The system of claim 25, wherein said mode allows an authorized user of said information center who is not an authorized user of the respective data area access system to retrieve a list of pieces of data that were entered into the system in conjunction with their authorization.

28. The system of claim 24, wherein use of each of said data area access systems is restricted to a respective set of authorized users.

29. The system of claim 24, wherein said system is configured and adapted for effecting communication between any of said information center and said data area access systems in an exclusively secure manner.

30. The system of claim 24, wherein said system is configured and adapted such that exclusively said secure data memories serve to store any pieces of data entered into said system.

31. The system of claim 24, wherein said system is configured and adapted for confirm both user authorization and the authorized user's access rights each time a piece of data entered into the system is to be accessed.

32. The system of claim 24, wherein
    a) said system is configured and adapted for deriving information from pieces of data entered into said system, and
    b) access to any part of said derived information is restricted to the same extent as the pieces of data form which it is respectively derived.

33. The system of claim 24, wherein
    a) said system is configured and adapted for complementing pieces of data entered into said system with referenced information, and
    b) access to any part of said reference information is restricted to the same extent as the pieces of data it respectively complements.

34. The system of claim 24, wherein said system is configured and adapted for insuring that pieces of data entered into said system are not replicated within the system.

35. A system comprising:
    a) a plurality of data area access systems, each having a secure data memory associated therewith; and
    b) an information center, wherein
    c) said system is configured and adapted such that entry of a piece of data into said system comprises a writing of said piece of data to a respective one of said secure data memories that can only be effected by an authorized user of the data area access system associated with the respective secure data memory and in conjunction with the authorization of an authorized user of said information center,
    d) said information center is configured and adapted for storing information that defines respective access rights for each piece of data entered into the system,
    e) said system is configured and adapted such that in each case the data is stored only once in one of said data area access systems not accessible to the owner of the rights, and
    f) said system is configured and adapted such that display and modification of the information defining the access rights to said entered piece of data is restricted to said authorized user of said information center, in conjunction with whose authorization said entry was effected.

36. The system of claim 35, wherein said system is configured and adapted such that access to any piece of data entered into the system is restricted to those authorized users of the data area access systems having appropriate access rights as defined by said information for the piece of data to be accessed.

37. A system comprising:
   a) a plurality of data area access systems, each having a secure data memory associated therewith; and
   b) an information center, wherein
   c) said system is configured and adapted such that entry of a piece of data into said system comprises a writing of said piece of data to a respective one of said secure data memories that can only be effected by an authorized user of the data area access system associated with the respective secure data memory and in conjunction with the authorization of an authorized user of said information center,
   d) said information center is configured and adapted for storing information that defines respective access rights for each piece of data entered into the system,
   e) said system is configured and adapted such that in each case the data is stored only once in one of said data area access systems not accessible to the owner of the rights, and
   f) said system is configured and adapted such that access to any piece of data entered into the system is restricted to those authorized users of the data area access systems having appropriate access rights as defined by said information for the piece of data to be accessed.

* * * * *